Jan. 19, 1932.  C. R. NICHOLS ET AL  1,841,376
ELECTRICAL PROSPECTING
Filed Sept. 1, 1928    3 Sheets-Sheet 1
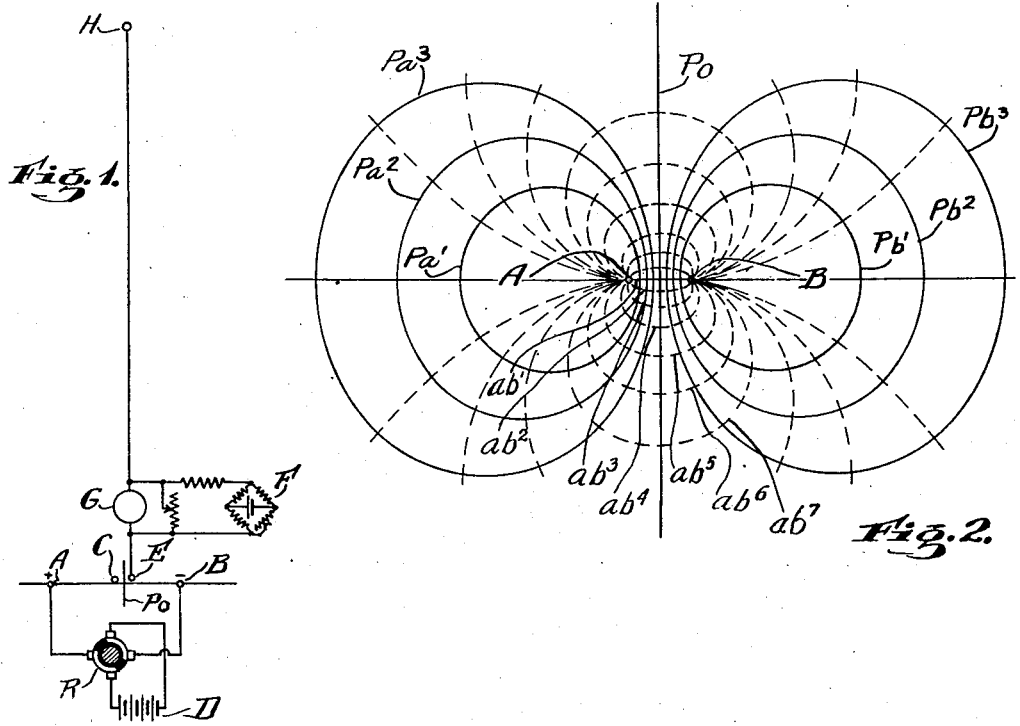
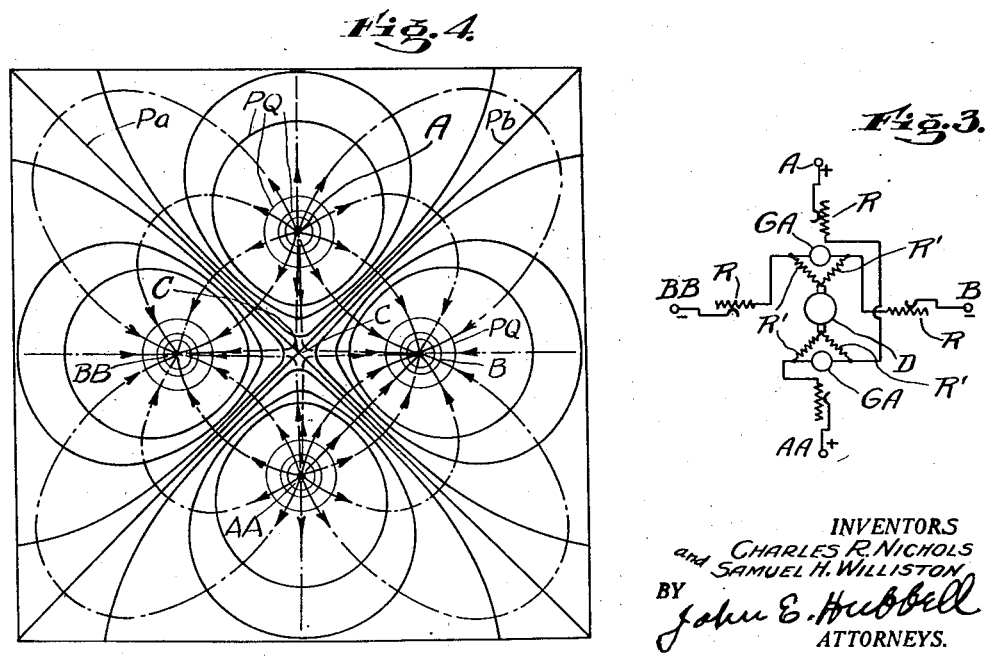
INVENTORS
CHARLES R. NICHOLS
and SAMUEL H. WILLISTON
BY John E. Hubbell
ATTORNEYS.

Jan. 19, 1932.   C. R. NICHOLS ET AL   1,841,376
ELECTRICAL PROSPECTING
Filed Sept. 1, 1928   3 Sheets-Sheet 2

INVENTORS
Charles R. Nichols and
Samuel H. Williston
BY
John E. Hubbell
ATTORNEYS.

Jan. 19, 1932.  C. R. NICHOLS ET AL  1,841,376
ELECTRICAL PROSPECTING
Filed Sept. 1, 1928    3 Sheets-Sheet 3
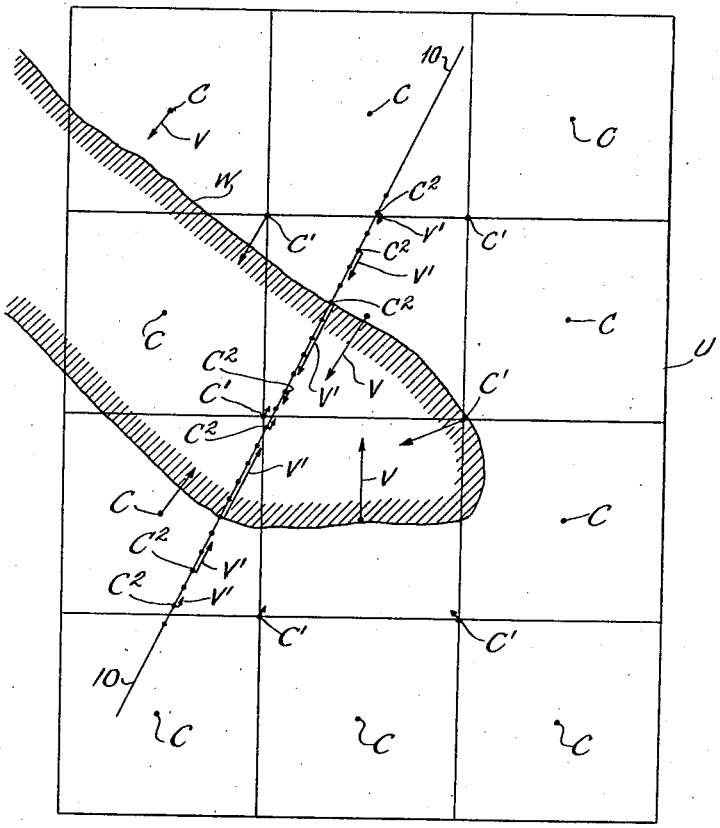
Fig. 9,
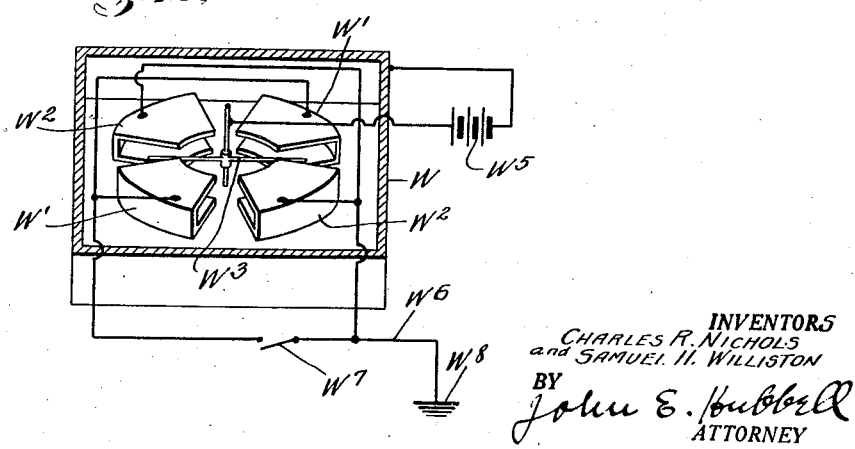
Fig. 10,
INVENTORS
CHARLES R. NICHOLS
and SAMUEL H. WILLISTON
BY
John E. Hubbell
ATTORNEY Patented Jan. 19, 1932

1,841,376

UNITED STATES PATENT OFFICE

CHARLES R. NICHOLS AND SAMUEL H. WILLISTON, OF DALLAS, TEXAS

ELECTRICAL PROSPECTING

Application filed September 1, 1928. Serial No. 303,542.

The present invention relates to a method of electrical prospecting in which the location and character of bodies of oil bearing sand or other earth portions of different electrical resistances from the adjacent earth, are determined by creating an electric current flow through the earth and detecting electrical effects at the earth's surface due to the modifications in the distribution of such current flow through the earth produced by such bodies or earth portions.

The present invention is characterized by the creation of such an electric current flow through the earth as to impress an identifiable potential condition or characteristic on a portion of the earth's surface, and by the determination of the direction and extent of the displacement, if any, of such portion from a geographical location which is fixed by the arrangements creating such current flow, and with which said surface portion will or will not coincide, accordingly as the distribution of the current flow through the earth adjacent said location is not or is significantly affected by an earth body or bodies of different conductivity from the adjacent earth.

The location of the earth's surface portion on which the identifiable potential condition or characteristic is impressed is determined, in general, by direct or indirect comparison of the potential of said portion with the potential at some reference point. The reference potential may be a base earth potential such as exists at some earth point so remote from the portion of the earth to which the bulk of artificial earth current produced is confined, that its potential is not significantly affected by said current, or, when the current flow through the earth is so established as to create equi-potential lines intersecting at the surface of the earth, and thereby impress the same potential characteristics on all points of said intersecting lines, the potential characteristic of any point on any such line may be identified by comparing it with the potential of points along another of the intersecting lines.

The invention is further characterized by the systematic manner in which different sections of the general field of exploration are energized, and the potential effects thereby produced are measured, so that the effects successively measured, as the different sections of the field of exploration are successively energized, are similar functions of the distribution of the earth current flows produced by such successive energizations, and in consequence differ from one another only as the result of the different effects on earth current distribution produced when the different field sections are energized, by a body or bodies differing in conductivity from the adjacent earth. The measured results obtained by such systematic exploration collectively provide information as to the character of different portions of the earth underlying the field of exploration which are much more definite and precise than can ordinarily be obtained by the same number of observations in the same field of energization when the latter is sectionally energized and the measurements are made, not systematically, but in a haphazard manner.

The present invention is adapted for use in locating a subsurface body or bodies of higher conductivity than the surrounding earth, and was primarily devised and is especially adapted for use in determining the location and character of bodies of oil sand with a view to determining where oil wells may be drilled to advantage. Such bodies of oil sand are commonly located at depths below the earth surface varying from a few hundred feet up to many thousand feet. Field use of the present invention has established its practical capacity for use in determining the location of such oil bearing sand bodies at depths below the earth's surface extending to about 3,000 feet, and we believe the invention is well adapted for use in locating oil sand bodies at much greater depths.

In extended experimentation, and in the practical use of our invention in various oil fields in this country, we have found that natural subsurface bodies of oil sands invariably produce potential center displacement effects of the character which would be produced if the specific resistance of those bodies were substantially lower than that of the adjacent earth. We recognize the possibility that such displacement may be due to saline matter associated with the oil sands and not to the direct action of the latter, but are not certain that this is the case.

Heretofore various methods of electrical prospecting have been proposed, and some of such methods have been used to some extent in locating ore bodies of relatively high conductivity located at distances below the earth's surface extending in some cases to a few hundred feet, but the electrical prospecting methods heretofore proposed do not possess the characteristics hereinbefore mentioned, and are apparently quite incapable of successful use in locating oil bearing sands at the considerable depths below the surface of the earth at which such sands are ordinarily found.

The various features of novelty which characterize our invention are pointed out with particularity in the claims annexed to and forming a part of this specification. For a better understanding of the invention, however, and the advantages possessed by it, reference should be had to the accompanying drawings and descriptive matter, in which we have illustrated and described preferred embodiments of the invention.

Fig. 1 is a diagrammatic representation of an exploration field energizing system and exploring assembly;

Fig. 2 is a chart diagrammatically illustrating current distribution and potential conditions which may exist when the field energization system of Fig. 1 is in use;

Fig. 3 is a diagrammatic representation of one field energization system producing a potential center;

Fig. 4 is a chart analogous to Fig. 2, illustrating effects produced in one condition of use of the system shown in Fig. 3;

Fig. 9 is a record chart showing data obtainable by a systematic exploration; and Fig. 10 is a diagram representing one use of an electrometer in locating a point having a particular potential characteristic.

Figure 5:
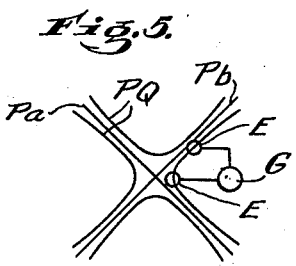
Fig. 5 is a diagram illustrating one method of locating a potential center.

In the arrangement shown in Fig. 1, A and B represent earth points of energization connected to a source of current D shown as a battery, but which is ordinarily a direct current dynamo, and E represents an exploring electrode connected to one terminal of a detector circuit including a galvanometer C and having its other terminal connected to a potential reference electrode H in contact with the earth at a reference point so remote from the points A and B that its potential is not significantly affected by the current flow produced between the points A and B by the source of current D.

In the preferred use of the apparatus shown in Fig. 1, the exploring electrode E is moved over the surface of the earth along the line A—B until the zero potential point on that line is located. That point is at the intersection with the line A—B of the zero potential line Po. By the terms zero potential line and zero potential point as used herein, is meant a line and a point, respectively, on the earth's surface at which no change in potential is created by the artificial earth energization current flow. The line Po will be perpendicular to the line A—B and will intersect the latter at the point C midway between points A and B, if all portions of the earth sufficiently close to the point C to affect the potential difference between displaced points on the line A—B are of uniform conductivity. If, however, any such earth portion is of different conducitivity from the adjacent earth and is located closer to one of the energization points A and B than to the other, the zero potential point on the line A—B will be displaced from the point C, in a direction and by an amount which depends on the character and location of such earth portion.

Any significant effect on the potential at the earth point at which the reference electrode H is located is avoided by locating that electrode not closer to either point A or B than about five times the distance between the points A and B. Owing to natural causes, not generally understood but giving rise to what are commonly called stray earth currents, the earth potential at the reference electrode H location will ordinarily be different from that existing at any point on the line A—B, when no potential difference is impressed between points A and B. With the electrodes E and H separated by a distance of 50,000 feet, the potential difference due to natural causes frequently amounts to as much as 100 millivolts and is sometimes much greater. The disturbing effect of such potential difference on the potential comparison to be made, may be eliminated or compensated for, as by adjusting the variable potentiometer F to impress on the terminals of the galvanometer G, such a balancing E. M. F. that when the exploring electrode E is located at the midpotential point, the galvanometer will give no significant deflection on an interruption or reversal of the current flow between the points A and B.

Known expedients may be employed to avoid polarization trouble and to minimize earth contact resistance. For example, the earth at each electrode and energization point may be impregnated with a salt solution of the metal forming the electrode or part in contact with the earth; and at each energization point contact with the earth is ordinarily effected by the use of a multiplicity of metal stakes connected to the corresponding terminal of the current source and driven into the earth at points distributed over a considerable surface area such as that lying within a circle of 50 feet or so in diameter. When contact with the earth at points A and B is effected in this manner, no significant practical error is made in assuming each energization point to be the center point of the area in which the contact stakes are driven, especially because of the small dimensions of that area as compared with the distance between the two energization areas.

To eliminate the effect of stray earth currents in the vicinity of the energization field, provision should be made for interrupting and reversing the current flow between the points A and B so as to permit quickly repeated readings of the galvanometer G under the different conditions. For this purpose a motor operated reversing switch R is conveniently employed. The source of current D, which ordinarily is an engine driven dynamo or dynamos, the reversing switch R, and associated meters, the galvanometer G, potentiometer F, and other accessories of the plant, including meters measuring the dynamo voltage and amperage, etc., may be mounted for convenient transport upon a motor truck or like vehicle.

By way of illustration of the practical capacity of the apparatus shown in Fig. 1, it is noted that in field use of such apparatus in locating bodies of oil sands, the distance between the energization points A and B has been varied from 3,000 feet up to 14,000 feet; the voltage at the terminals of the source of current D has been varied from 50 volts to 900 volts; and the current delivered by said source has been varied from 10 amperes up to 100 amperes or so. There is reason to believe, however, that in some cases the energization points may advantageously be spaced much more than 14,000 feet apart, and that improved results may sometimes be obtained by increasing the voltage and current output of the source of current above the maximum values mentioned above. With the energization points A and B separated by a distance at 10,000 feet, a considerable body of oil sand underlying the portion of the line A—B between the points A and C at a depth of approximately 2,500 feet and not extending under the portion of the line between the points C and B, will displace the midpotential point from the geographic midpoint C along the line A—B toward the point A as much as 1,400 feet, or even more if the body of oil sand is relatively large.

It will be apparent that with the apparatus shown in Fig. 1, it is possible to locate points on the zero potential line $Po$ at as great a distance from the line A—B as may be desirable, by suitably moving the exploring electrode E over the surface of the earth. While we consider it preferable in practice to directly locate the zero potential point on the line A—B, and to then directly measure its displacement from the midpoint C in feet or analogous units of distance, the direction and extent of displacement of the zero potential point from the midpoint C may be measured indirectly by locating the exploring electrode E at the midpoint C and observing the deflection variations of the galvanometer G, suitably calibrated for the purpose, occurring when the current flow between the energization points A and B is established and interrupted.

The exact location of the reference electrode H may be varied widely as will be apparent from the following explanation in connection with Fig. 2.

In Fig. 2, $Pa'$, $Pa^2$, $Pa^3$, $Pb'$, $Pb^2$, $Pb^3$ and $Po$ represent equi-potential lines which would be created at the earth's surface by a difference of potential between the energization points A and B if the subjacent earth within significant proximity of those points were of uniform conductivity. These equipotential lines represent the intersection with the earth's surface of equi-potential surfaces. The zero potential line $Po$ in this case is a midpotential line and is a section of the great circle at which the earth's surface is intersected by a midpotential plane passing through the center of the earth midway between the energization points A and B. The equi-potential lines $Pa'$, $Pa^2$, $Pb'$, $Pb^2$, etc., each represent the intersection with the earth's surface of a globular equi-potential surface which approaches hemispherical form when the distance between the surface and the corresponding energization point is relatively small, and is more and more distorted from the hemispherical form as the distances between the surface and the energization point increases. Such equi-potential surfaces are normal to the lines of current flow, $ab'$, $ab^2$—$ab^7$ through the earth between the points A and B.

Theoretically, of course, the entire earth forms the conductor through which current flows between the points A and B, and no matter where the electrode H may be located its potential will be affected by the current flow between the points A and B. Actually, however, the major portion of the current flowing between the points A and B is confined to a portion of the earth, no point of which is more remote from the line A—B than the length of that line, and the magnitude of the potential effect on the reference contact H quickly decreases to an insignificant amount as the distance between it and the energization points A and B is increased. As will be apparent upon reflection, if the distance measured along the line A—B between the midpotential or zero potential line $Po$ and the equi-potential line $Pa^3$ or $Pb^3$ does not exceed 20 feet, for example, with the reference electrode H located at any point on the earth's surface not within the equi-potential lines $Pa^3$ and $Pb^3$, the current flow between A and B can produce a maximum earth potential change at the location of H not greater than that corresponding to a displacement of the midpotential point along the line A—B of about 20 feet.

In field use of the invention it has been demonstrated that if the reference electrode H is located outside of equi-potential lines $Pa^3$ and $Pb^3$ intersecting an extension of the line A—B at a point beyond either point A or B at a distance therefrom, not less than about 5 times the distance between the points A and B, the magnitude of the potential effect of the current flow between th points A and B at the reference point H is practically negligible, and ordinarily need not be compensated or allowed for, because its maximum apparent displacement effect on the midpotential point, is an insignificant fraction of the actual midpotential point displacement produced by an underlying body of oil sand of appreciable magnitude.

It is theoretically possible to locate the zero potential point on the line A—B by direct observation of the potential differences created at points along the line A—B by establishing and interrupting the current flow between the points A and B. This may be accomplished, for example, by the aid of an electrometer W as illustrated in Fig. 10. The electrometer W as conventionally illustrated in Fig. 10, comprises a pair of opposed quadrants W' and a second pair of opposed quadrants $W^2$ interposed between the quadrants W'. Pivoted in coactive relation with the quadrants W' and $W^2$ is a needle $W^3$ given a suitable potential bias by its connection to one side of a battery $W^5$, the other side of which is connected to the instrument case in which the needle and quadrants are mounted. One opposed pair of quadrants, as shown the quadrants $W^2$, is connected to earth at $W^8$ by the conductor $W^6$, and $W^7$ represents a switch for connecting the other pair of quadrants W' to the earth or disconnecting it at will.

In the contemplated use of the apparatus shown in Fig. 10, the conductor $W^6$ will be connected to earth at a point assumed to be at or in the neighborhood of the point of no potential change, and the switch $W^7$ will first be closed to thus give all four quadrants the potential of the earth at the point to which the conductor $W^6$ is connected, during a period in which no current flow is being maintained between the energization points A and B. When, thereafter, the switch $W^7$ is opened current flow between the energization points A and B is set up. When current flow between the energization points A and B is thus created, the needle $W^3$ will, or will not, deflect accordingly as the potential of the point to which the conductor W is connected is or is not altered by the current flow. If the ground connection $W^8$ is not located at a point at which no potential change is created, the direction and extent of needle deflection may afford some indication of the direction and extent of change in location of the earth connection $W^8$ required to make it coincide with the point of no potential change.

Fig. 3 illustrates an energization system which may be used to create two zero potential lines $Pa$ and $Pb$, shown in Fig. 4, which intersect at a potential center or point which will, or will not, coincide with the geographical midpoint C of the energization field, accordingly as the resistance of the different portions of the underlying earth sufficiently close to said midpoint are, or are not of uniform resistance. The four energization points, A, AA, B and BB shown in Figs. 3 and 4 are located at corners of a rectangle which may, or may not, be a square. The two energization points at the opposite ends of the same diagonal of the rectangle are of the same polarity and are shown as connected to the corresponding terminal of the dynamo or other source D.

In the use illustrated in Fig. 4 of the energization system shown in Fig. 3, the resistances R in the current carrying conductors connecting the different energization points to the corresponding terminals of the source D are adjusted to insure an equal strength of current flow into or out of the earth at each of the four energization points. The required adjustments of the various resistances R may be determined in various ways. One convenient expedient for this purpose comprises a second resistance R' in each of the current carrying leads, the resistances R' in the leads running to each pair of energization points of the same polarity being equal and connected to the terminals of a corresponding galvanometer GA, so that the latter will show no deflection when the currents flowing through the two resistances R' are of equal strength. The adjustments of the resistances R thus provided for, compensate for variations in contact resistance at the different energization points.

In Fig. 4 the various lines PQ represent equi-potential lines which may be traced about the various energization points in the respective quadrants between the intersecting zero potential lines Pa and Pb when all portions of the earth within a significant distance of the midpoint C of the energization rectangle are of the same conductivity. In such case the zero potential lines intersect at a potential center coinciding with the geographical midpoint C. The equi-potential lines PQ differ from the various lines $Pa'$, $Pa^2$, etc., of Fig. 2 in their general contour, only in that such lines PQ as closely approach the midpotential center have definitely pointed or cusp-like portions adjacent, and pointing toward said center.

An earth portion or body differing in conductivity from the adjacent earth and within significant proximity to, and closer to one than to another of the points of energization will displace the zero potential center relative to said points of energization. When the resistivity of the said body is higher than that of the adjacent earth, the displacement will be in one direction, and when the body resistivity is less than that of the adjacent earth, the displacement will be in the opposite direction. In the practical use of our invention in locating many sub-surface bodies of oil bearing sands, we have found without exception that the zero potential center displacement is toward the body so located when the latter underlies one energization point and does not underlie a cooperating energization point of different polarity. With the method of energization shown in Fig. 3, not only the extent but the true direction of displacement of a particular zero potential point, namely, the potential center, can be readily determined.

The potential center created by the energization of the earth as illustrated in Figs. 3 and 4, may be located by the use of a detector circuit having one terminal connected to a remote potential reference electrode H as previously described. In many cases, however, the potential center can be more advantageously located by tracing out equipotential lines adjacent the potential center by the use of a detector circuit comprising two exploring electrodes E between which the galvanometer G is connected. With such a detector circuit, the midpotential center can be found by moving the two electrodes E around until one is located on one, and the other on the second of intersecting equi-potential lines, since with the mode of energization illustrated in Figs. 3 and 4, the only equi-potential lines which can intersect are the zero potential lines whose intersection defines the potential center. In practice it has usually been found unnecessary, however, to actually trace out the zero potential lines, since the potential center can be readily approximated by tracing out the cusp portion of one of the equi-potential lines PQ coming close to the potential center as illustrated in Fig. 5, and can be approximated with a very considerable accuracy by tracing out a pair of such equi-potential line cusps located in quadrants at opposite sides of the potential center.

Figure 6:
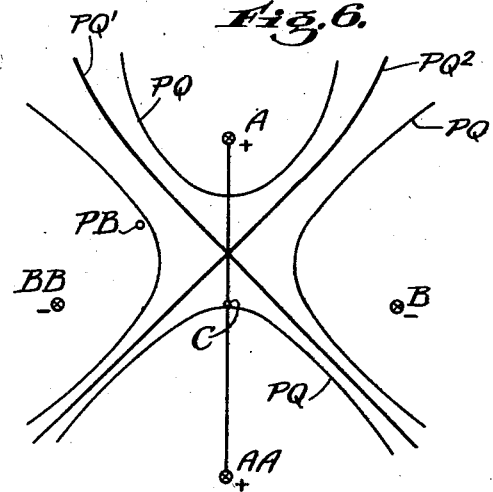
Fig. 6 is a chart analogous in character to Fig. 4, illustrating effects produced in another use of the energization system shown in Fig. 3.

When the resistances R are adjusted to make the current flow at the energization point A definitely less than the current flow at the point AA, while maintaining equality of current flow at the points B and BB, intersecting equi-potential lines $PQ'$ and $PQ^2$, as shown in Fig. 6, will be produced, and with the significant subjacent portions of the earth of uniform conductivity, the point of intersection will be located at a definite distance from the midpoint C along the line AC toward the point A. That definite distance may be precisely calculated from known current flow and potential distribution laws. The potential center formed by the intersection of the equi-potential lines $PQ^2$ can be readily located by the use of such a detector circuit as is shown in Fig. 5, and the displacement of the potential center at the intersection of the lines $PQ^2$ from the position at which it would be located if the significant subjacent portions of the earth were of uniform conductivity, gives an indication of the character and location of the earth portions producing such displacement.

By varying the ratio of the unequal current strengths at A and AA, the normal or equal resistance position of the potential center formed by the intersecting equi-potential lines can be shifted to various positions between the points A and C, and between the points C and B, and, of course, with the current strengths at A and AA maintained equal to each other, variations in the relative strengths of the currents at the energization points B and BB will shift the potential center formed by intersecting equi-potential lines to different positions along the lines B—BB. Furthermore, by adjusting the resistances R of Fig. 3 to secure current flows at the energization points B and AA equal to one another, but larger than the current flows at the points A and BB, a potential center PB, located as shown in Fig. 6, in the quadrant A—C—BB will be formed by intersecting equi-potential lines at a point in the quadrant depending upon the relative strengths of the current flows at B and AA, and at A and BB, respectively. In an analogous manner potential centers can be produced in the other quadrants A—C—B, B—C—AA, and AA—C—BB. In general, the procedure involved in the particular form of the invention illustrated in connection with Fig. 6 is too complicated to justify the use of such procedure, at least in prospecting for oil sands, except in special cases as when it is unusually difficult to shift the energization points A, B, AA, and BB from one section to another of the field to be explored.

Figure 7:
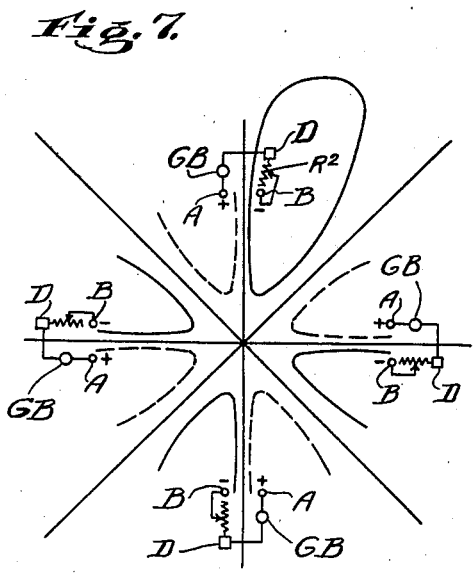
Fig. 7 is a diagrammatic representation of an alternative method of field energization to produce a potential center.

A potential center may be produced by the use of more than two pairs of energization points of opposing polarity. When more than two pairs of energization points are employed to create equipotential lines intersecting at a common potential center, moreover, the two energization points of opposite polarity between which a zero potential line is created, may be spaced much closer together than they are to any other energization point as is illustrated in Fig. 7. In Fig. 7 each of a pair of energization points A and B of opposing polarity are energized from a common source of current D and need be only a few hundred feet apart, even though the distance between any two points not paired together may be many thousands of feet. The arrangement shown in Fig. 7 is of especial utility where difficulty is experienced in providing current transmitting lines from a common source of power to the various energizing points. The amperage output of the different generators D of Fig. 7 must be kept constant, or at least in definite proportion, and this requires constant observation of the current output meters GB and corresponding adjustments of the resistances $R^2$ regulating such outputs.

Figure 8:
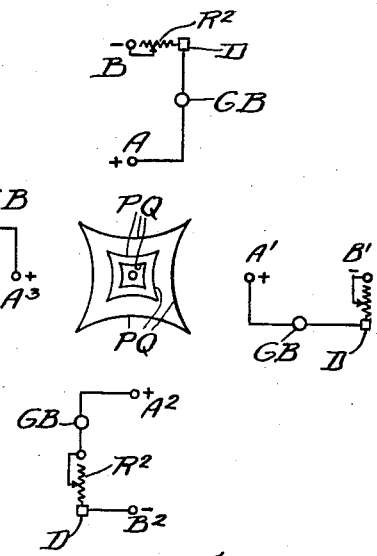
Fig. 8 is a diagrammatic representation of still another method of field energization to produce a potential center.

A readily identifiable potential center not located at the intersection of a pair of intersecting equi-potential lines on the earth's surface, but located approximately at the center of a polygonal figure formed by the intercepted portions of three or more equi-potential lines each of which intersects with two of the others can be produced by the method of field energization illustrated in Fig. 8. In that figure four pairs of energization points A, B; A', B'; $A^2$, $B^2$; $A^3$, $B^3$ are symmetrically disposed about an energization field center in such manner that the two points of each pair lie on a straight line passing through the center with the energization points A, A', $A^2$ and $A^3$ of one polarity located at one distance, and the other four energization points at another distance from the midpoint. As shown in Fig. 8, the energization points of each pair are energized from a corresponding current source D, and the current output of each source D must be regulated as described in connection with Fig. 7.

With the arrangement shown in Fig. 8 equi-potential lines PQ may be traced on the earth's surface about a potential center. Each such equi-potential line will be a polygon with each of its sides similarly curved about the corresponding inner energization point A, A', $A^2$ or $A^3$ and will be similarly disposed with respect to the field midpoint C, if the significant underlying earth structure is of uniform conductivity, but this symmetrical disposition does not prevail, of course, if a body of oil sand in significant proximity to the field exerts different effects on the distribution of current flow through the earth toward or from the different energization points. The potential center will lie within the area outlined of any such equi-potential polygon which may be traced. By suitable manipulation of the detector circuit exploring electrodes, the area of the polygon traced about the potential center may be made as small as the desired accuracy of approximation to the exact position of the potential center may require.

With the arrangement shown in Fig. 8, an actual potential center point at the earth's surface is produced, but that point is located at the tip of a pyramidal equi-potential surface formed of sections of equi-potential surfaces curving about the various inner energization points A, A', $A^2$ and $A^3$, and the corners of said pyramidal surface are formed by equi-potential lines which intersect at the surface of the earth but which cannot be directly traced out with the detector apparatus described herein, because those lines do not lie on the surface of the earth.

For the creation and location of a potential center in the general manner illustrated in Fig. 8, the number and location of the energization points may be varied, but practical considerations and ease of interpreting the observational data obtainable, ordinarily require the use of a comparatively small number of energization points and their symmetrical disposal at the corners of symmetrical geometrical figures.

The particular form of the field energization system which is preferable for use in any particular case ordinarily depends upon various conditions. For a rapid preliminary or reconnaisance exploration of a relatively large block of comparatively open country, the particular form of the invention illustrated in Figs. 3 and 4 is ordinarily preferable, but where in such exploration it is practically convenient or necessary to follow existing roads, or to avoid gullies or thickets difficult to penetrate, the two energization point system of Figs. 1 and 2 may be preferable. When the preliminary exploration gives no indication of significant non-uniform resistance conditions, no further exploration of the field is ordinarily required. When, however, the preliminary exploration gives such indication, additional, and more intensive, exploration is ordinarily desirable, and in such additional exploration the particular form or forms of the invention best adapted for such work is dependent upon the conditions then confronted.

Further light on what has just been referred to is afforded by the chart shown in Fig. 9, which is a sort of a map U, of an area which may be assumed to be about six by eight miles, which has been preliminarily explored by the use of the method illustrated by Figs. 3 and 4. The points C on the map U represent the geographical midpoints of corresponding sections of the area, successively energized by the four-point midpotential method of Figs. 3 and 4. The points C are in rows spaced approximately 10,000 feet apart. The points C' represent similarly spaced centers of a second set of sections overlapping the sections first referred to. The arrows V associated with the different points C and C' represent by their lengths and directions, the extent and direction of potential center displacements from the corresponding geographical points C and C', found when the different sections were successively energized as described. To better the illustration with the small scale of Fig. 9, each arrow V is shown twice as long as the displacement which it represents. Points C and C' to which no arrows are applied, are points at which no significant displacement appears.

The arrows V suggest the existence of a body W of oil sand of considerable magnitude underlying the exploration field, but to obtain maximum assurance as to the character and form of the disturbing body W, additional exploration work is ordinarily necessary. Under the conditions assumed such additional exploration work may advantageously comprise a series of observations in which the potential centers are successively created along lines crossing the body W, by employing the particular form of the invention illustrated in Fig. 1. The line 10—10 represents one such line of secondary exploration, and the points C² thereon represent the geographical midpoints of the exploration field sections successively energized in the manner illustrated in Fig. 1 with the two energization points for each section spaced 14,000 feet apart. The arrows V' alongside the various points C² indicate the potential center displacements then found, and the information furnished by the observations represented by the arrows V', coupled with that furnished by the observations represented by the arrows V, ordinarily give very complete and accurate information as to the character and form of the body W. In some cases, of course, still other explorations of the portions of the field, by one or another of the methods hereinbefore described, may be necessary or desirable.

The potential center displacement effect of the body W depends, of course, upon its depth and to some extent upon its thickness, as well as upon its specific resistance. By repeating the displacement observations with different distances between the points of field energization, accurate information as to the depth of the body and considerable information as to its thickness can be obtained.

For example, if the upper side of the body W were two thousand feet below the surface of the earth, the energization of the field as illustrated in Fig. 1, by means of energization points located a couple of thousand feet apart would give little evidence of the existence of said body, whereas if the energization points were located not less than five thousand feet apart, a very definite indication of the existence of the body would be given. By comparing observations obtained with different spacings of the energization points it is thus possible to locate the approximate depth of the upper surface of the body, and by comparing the observed effects obtained with various spacings each of which is wide enough to give results significantly affected by the body, some approximation to the thickness of the body may be obtained.

The potential center displacements created and detected by the use of the invention will be affected, not only by the existence of oil sand or ore bodies of different conductivity from the adjacent earth, but also by the geological structure, but care in making and interpreting the observations will ordinarily make it possible to determine whether potential center displacements are due to the existence of a body of oil sand, or, for example, to a geological fault, or to a combination of both causes, and it is to be understood also, that in interpreting the data obtained by the use of the present invention, proper use of, and allowance for all other available information as to the geological structure afforded by test borings or otherwise determined should be made.

In the practice of the present invention, the use of direct current is considered practically preferable to the use of alternating current in creating the necessary current flow through the earth. However, with all of the methods of energization described herein it is possible to employ alternating current provided proper steps are taken to avoid the disturbing inductive effects produced when alternating current is employed.

The present case is in one part or another a continuation of our earlier filed applications Serial No. 129,430, filed August 16, 1926; Serial No. 147,310, filed November 9, 1926; and Serial No 206,829, filed July 19, 1927, each of which discloses and claims specific forms of the invention disclosed and generically claimed herein.

While in accordance with the provisions of the statutes we have illustrated and described the best forms of our invention now known to us, it will be apparent to those skilled in the art that changes may be made in the forms of the apparatus disclosed without departing from the spirit of our invention as set forth in the appended claims, and

Having now described our invention, what we claim as new and desire to secure by Letters Patent, is:

1. The method of electrical prospecting which consists in so creating an electric current flow through the earth between separated earth energization points as to impress a readily identifiable potential condition or characteristic on a portion of the earth's surface which occupies, or is displaced from a definite predeterminable geographical location accordingly as the potential at the earth's surface in proximity to said location is not or is significantly affected by changes in the distribution of current flow through the earth produced by an earth body or bodies of different conductivity from the adjacent earth, and determining the extent and direction of displacement, if any, of said surface portion from said position.

2. The method of claim 1 further characterized by the use of the potential of the earth at a point remote from the field of energization as a base potential for comparison with the potential of the earth's surface portion on which the identifiable potential characteristic is impressed.

3. The method of electrical prospecting which consists in creating a potential difference between separated points on the surface of the earth and determining the effect of such potential difference on the potential of the earth at another point on the earth's surface by comparing the potential of the last mentioned point when said potential difference is established with a base earth potential not significantly affected by said potential difference.

4. The method of electrical prospecting which consists in creating a potential difference between spaced apart earth points and determining the effect of such difference on the potential of another earth point relatively near to the first mentioned points, by comparing said potential with that of an earth point relatively remote from said first mentioned points.

5. The method of electrical prospecting which consists in creating a potential difference between two spaced apart energization points effective to increase the potentials of points along one portion and to decrease the potentials of points along another portion of the earth surface line between said energization points, and locating the point on said line between said portions at which no potential change is produced by the creation of said potential difference.

6. The method of electrical prospecting which consists in creating a potential difference between spaced apart energization points effective to increase the potentials of points in one portion and to decrease the potentials of points in another portion of the earth surface said portions being respectively adjacent to different ones of said energization points, and locating a point or points on the earth surface between said portions at which no potential change is produced by the creation of said potential difference.

7. The method of electrical prospecting which consists in successively and similarly energizing regularly displaced sections of an exploration field by so creating an electric current flow through the earth between separated earth energization points in each section when the latter is energized as to establish a readily determinable potential condition at a portion of the earth surface coinciding with or displaced from a definite predeterminable geographical portion of said section accordingly as the potential at the earth surface in proximity to the last mentioned portion is not or is significantly affected by changes in the distribution of current flow through the earth produced when the corresponding section is energized by an earth body or bodies of different conductivity from the adjacent earth, and comparing the extent and direction of displacement, if any, between the two said portions of each section with the corresponding displacements of the other sections.

8. In the electrical determination of the sub-surface composition of the earth, the method which consists in successively energizing sections of an exploration field by creating a potential difference between spaced apart portions of the earth surface in each field section in energizing the latter, and measuring an effect produced in each field section when so energized by the distribution of the earth current underneath the section, the effects so measured for the different sections being similar functions of the distribution of current flow through the earth under the different sections.

9. In the electrical determination of the sub-surface composition of the earth, the method which consists in successively energizing sections of an exploration field which are similarly displaced from one another, by creating a potential difference between spaced apart portions of the earth surface in each field section in energizing the latter, and measuring an effect produced in each field section when so energized by the distribution of the earth current underneath the section, the effects so measured for the different sections being similar functions of the distribution of current flow through the earth under the different sections.

10. In the electrical determination of the sub-surface composition of the earth, the method which consists in successively energizing sections of an exploration field by creating a potential difference between spaced apart portions of the earth surface in each field section in energizing the latter, and measuring the displacement, if any, from a predetermined geographical position of a point in each field section at which the potential of the earth's surface is not varied by the energization and deenergization of the field section.

11. In the electrical determination of the sub-surface composition of the earth, the method which consists in successively energizing sections of an exploration field which are similarly displaced from one another, by creating a potential difference between spaced apart portions of the earth surface in each field section in energizing the latter, and measuring an effect produced in each field section when so energized by the distribution of the earth current underneath the section, the effects so measured for the different sections being similar functions of the distribution of current flow through the earth under the different sections, and being independent of the intensity of said current flow.

12. In the electrical determination of the sub-surface composition of the earth, the method which consists in successively energizing sections of an exploration field by creating a potential difference between spaced apart portions of the earth surface in each field section in energizing the latter, measuring an effect produced in each field section when so energized by the distribution of the earth current underneath the section, the effects so measured for the different sections being similar functions of the distribution of current flow through the earth under the different sections, and determining resistance characteristics of the portion of the earth beneath said field by direct comparison of the measurements obtained.

13. In the electrical determination of the sub-surface composition of the earth, the method which consists in successively energizing different sections of an exploration field, by creating a potential difference between spaced apart portions of each field section in energizing the latter, to produce a measurable effect in each energized section which is a function of the distribution of current flow through the subjacent earth and is independent of the intensity of said current flow and which differs from the similarly produced effects for the other field sections only as a result of differences in electrical resistance of the portions of the earth underneath the different sections, measuring said effects, and determining resistance characteristics of the portion of the earth beneath said field by comparing said results.

14. In the electrical determination of the sub-surface composition of the earth, the method which consists in successively energizing sections of an exploration field, by creating a potential difference between spaced apart portions of the earth surface in each field section in energizing the latter, measuring an effect produced in each field section when so energized by the distribution of the earth current underneath the section, the effects so measured for the different sections being similar functions of the distribution of current flow through the earth under the different sections, and repeating the described operation with definitely different spacings of the portions of each field section between which a potential difference is impressed in energizing the section.

15. In the electrical determination of the sub-surface composition of the earth, the method which consists in successively creating a potential difference between different groups of the earth surface portions regularly distributed over the field of exploration, measuring an effect produced when a potential difference is created between the similarly energized portions of each group which is a function of the distribution of the earth current resulting from such potential difference and is independent of the intensity of said current, the effects so measured for the different groups being similar functions of the distribution of the resultant earth current flows, and the distance between the energized portions of each of some of said groups being different from the corresponding distances for the other groups whereby said measurements collectively indicate the location and depth of earth resistance disturbing bodies in the subjacent earth.

16. The method of electrical prospecting which consists in comparing the potential of an earth point at a time when a potential difference is maintained between other earth points so located with respect to the first mentioned earth point as to create a significant current flow through the earth adjacent the first mentioned point, with the potential of the earth at a point not remote from the first mentioned point when said potential difference does not exist.

17. The method of electrical prospecting which consists in creating a current flow through the earth between separated earth energization points, and determining the effect of such current flow on the potential at another earth point by direct comparison of the potential at the last point when said current flow exists with the potential at the point when the current flow does not exist.

18. The method of electrical prospecting which consists in creating a current flow through the earth between separated earth energization points, and determining the effect of such current flow on the potential at another earth point by charging one body with the potential at the last mentioned point when said current flow exists, charging another body with the potential at the last mentioned point when said current flow does not exist, and determining an effect which is a function of the difference in the potentials of the charged bodies.

19. The method of electrical prospecting which consists in creating a current flow through the earth between separated earth energization points, and determining the effect of such current flow on the potential at another earth point by charging one body with the potential at the last mentioned point when said current flow exists, charging another body with the potential at the last mentioned point when said current flow does not exist, and measuring the difference in the potentials of the charged bodies.

20. The method of electrical prospecting which consists in creating a current flow through the earth between separated earth energization points and determining the effect of such current flow on the potential at another earth point by successively impressing on an electrometer the potentials of the last mentioned point when said current flow exists and when said current flow is reversed.

21. The method of electrical prospecting which consists in so creating an electrical current flow through the earth between separated earth energization points as to impress a predetermined potential condition or characteristic on a portion of the earth's surface which occupies, or is displaced from a definite predeterminable geographical location accordingly as the potential at the earth's surface in proximity to said location is not or is significantly affected by changes in the distribution of current flow through the earth produced by an earth body or bodies of different conductivity from the adjacent earth, and determining the extent and direction of displacement, if any, of said surface portion from said position.

22. The method of electrical prospecting which consists in so creating an electrical current flow through the earth between separated earth energization points as to impress a readily identifiable potential condition or characteristic on a portion of the earth's surface which differs from the potential at each of said energization points by an amount exceeding the potential difference between each such energization point and any point between the latter and said portion, and which occupies, or is displaced from a definite predeterminable geographical location accordingly as the potential at the earth's surface in proximity to said location is not or is significantly affected by changes in the distribution of current flow through the earth produced by an earth body or bodies of different conductivity from the adjacent earth, and determining the extent and direction of displacement, if any, of said surface portion from said position.

23. The method of electrical prospecting which consists in creating a current flow through the earth between separated earth energization points and determining the effect of such current flow on the potential at another earth point by successively impressing on an electrometer the potentials of the last mentioned point when said current flow exists and when said current flow does not exist.

Signed at New York city, in the county of New York and State of New York, this 31st day of August A. D. 1928.

CHARLES R. NICHOLS.
SAMUEL H. WILLISTON.